United States Patent
Bielfeldt et al.

[11] 3,981,662
[45] Sept. 21, 1976

[54] INJECTION-MOLDING MACHINE, ESPECIALLY FOR THERMOSETTING OR THERMALLY CROSS LINKABLE SYNTHETIC RESINS

[75] Inventors: Friedrich Bernd Bielfeldt, Aidenried; Klaus Händler, Puchheim-Bhf, both of Germany

[73] Assignee: Krauss-Maffei Aktiengesellschaft, Munich, Germany

[22] Filed: Dec. 27, 1971

[21] Appl. No.: 212,186

[30] Foreign Application Priority Data
Dec. 31, 1970 Germany............................ 2064670

[52] U.S. Cl................................ 425/247; 425/250; 425/246
[51] Int. Cl.².......................................... B29F 1/022
[58] Field of Search.......... 425/245, 246, 247, 248, 425/250, 186, DIG. 51, 243, 242

[56] References Cited
UNITED STATES PATENTS

| | | |
|---|---|---|
| 2,226,408 | 12/1940 | Nast................................ 425/248 X |
| 2,834,992 | 5/1958 | Jupa................................ 425/243 X |
| 2,923,031 | 2/1960 | Collion........................ 425/DIG. 51 |
| 3,464,091 | 9/1969 | Bielfeldt............................. 425/246 |
| 3,663,145 | 5/1972 | Teraoka............................. 425/250 |

FOREIGN PATENTS OR APPLICATIONS

| | | |
|---|---|---|
| 994,417 | 11/1951 | France................................. 425/245 |
| 44-21230 | 10/1969 | Japan........................... 425/DIG. 51 |

*Primary Examiner*—Francis S. Husar
*Assistant Examiner*—David S. Safran
*Attorney, Agent, or Firm*—Karl F. Ross; Herbert Dubno

[57] ABSTRACT

An injection-molding machine, especially for thermally crosslinkable and thermosetting materials, and a method of operating same, wherein a resin-distribution or manifold plate is provided along one of the mold halves and is clamped in place by the mold-closing and retaining means during injection, but the plate is withdrawn thereafter to prevent heating of the distribution channels and hardening or crosslinking of the resinous material therein.

10 Claims, 5 Drawing Figures

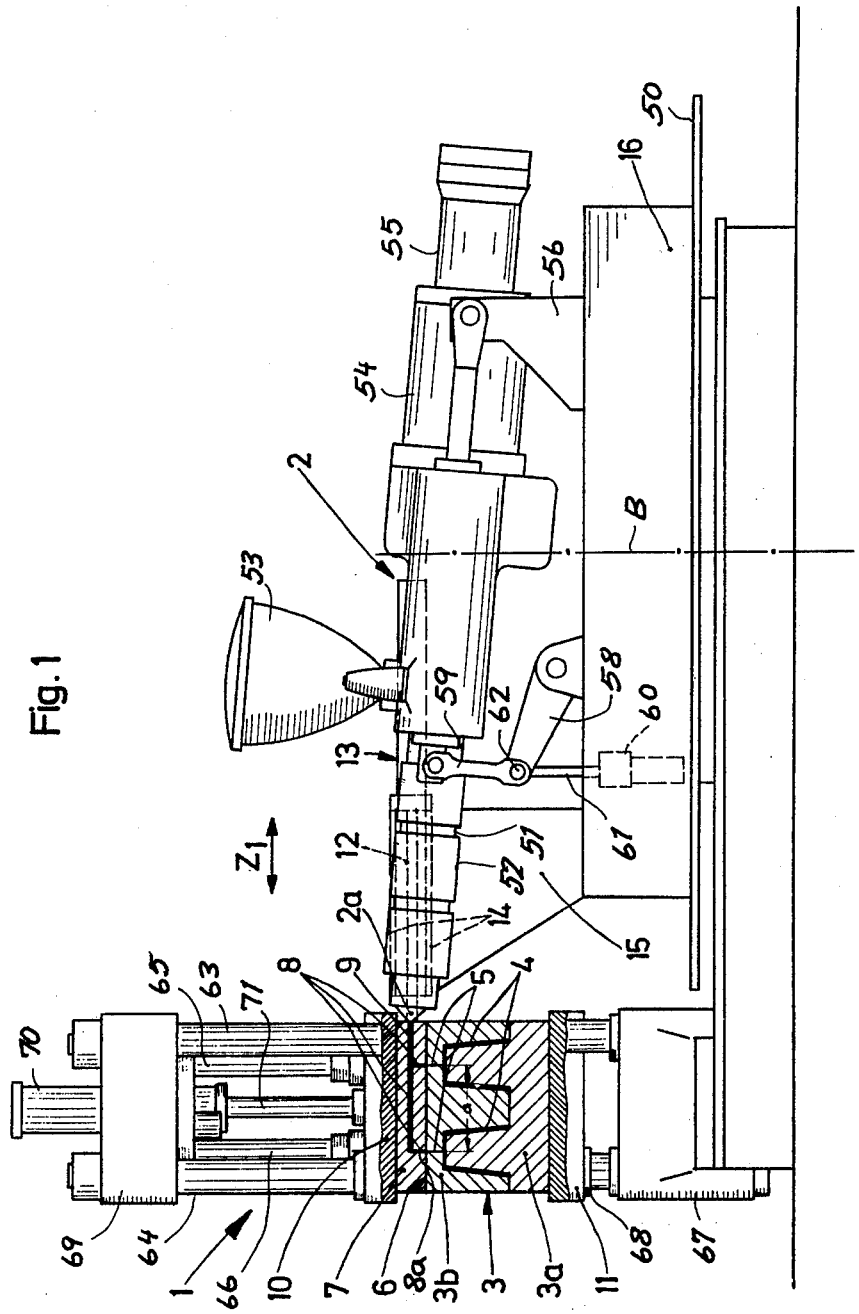

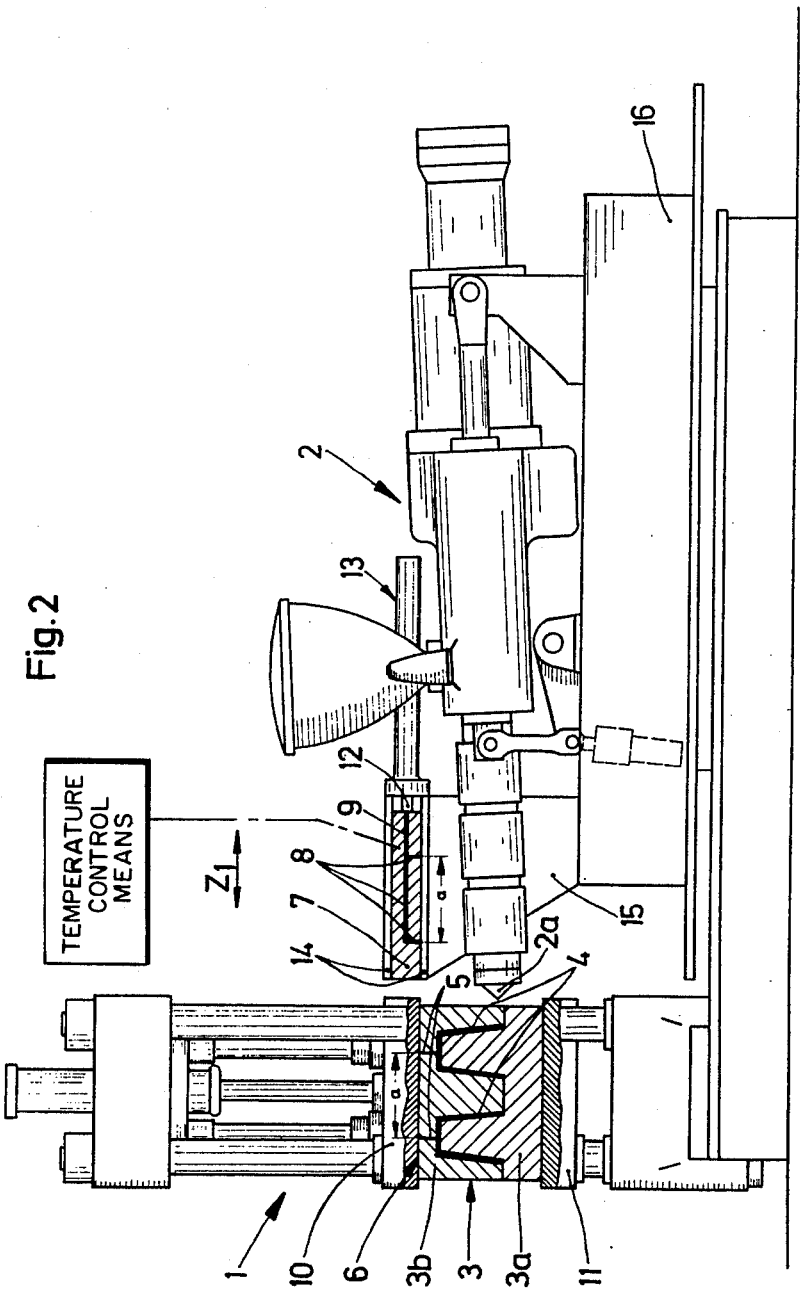

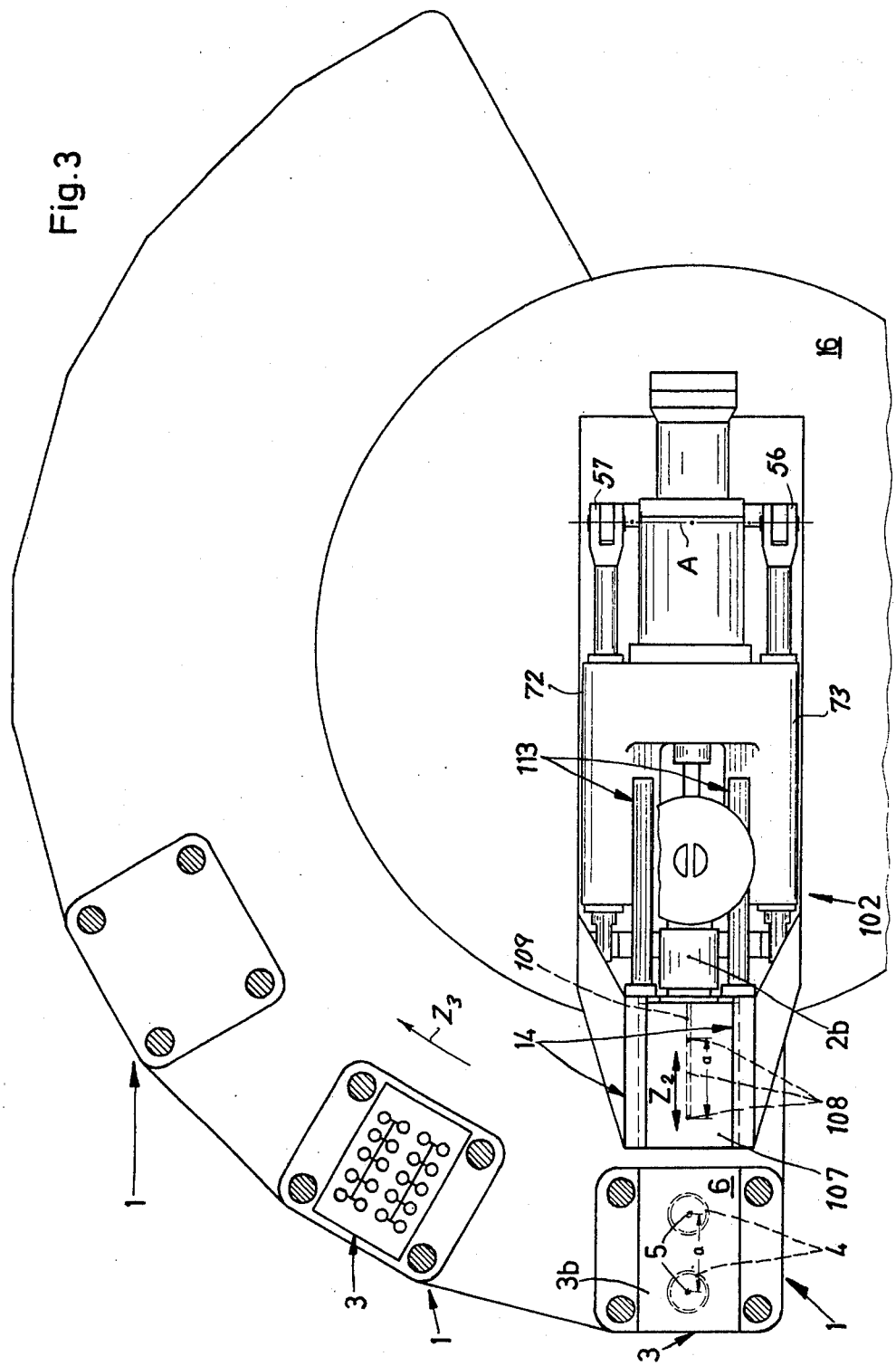

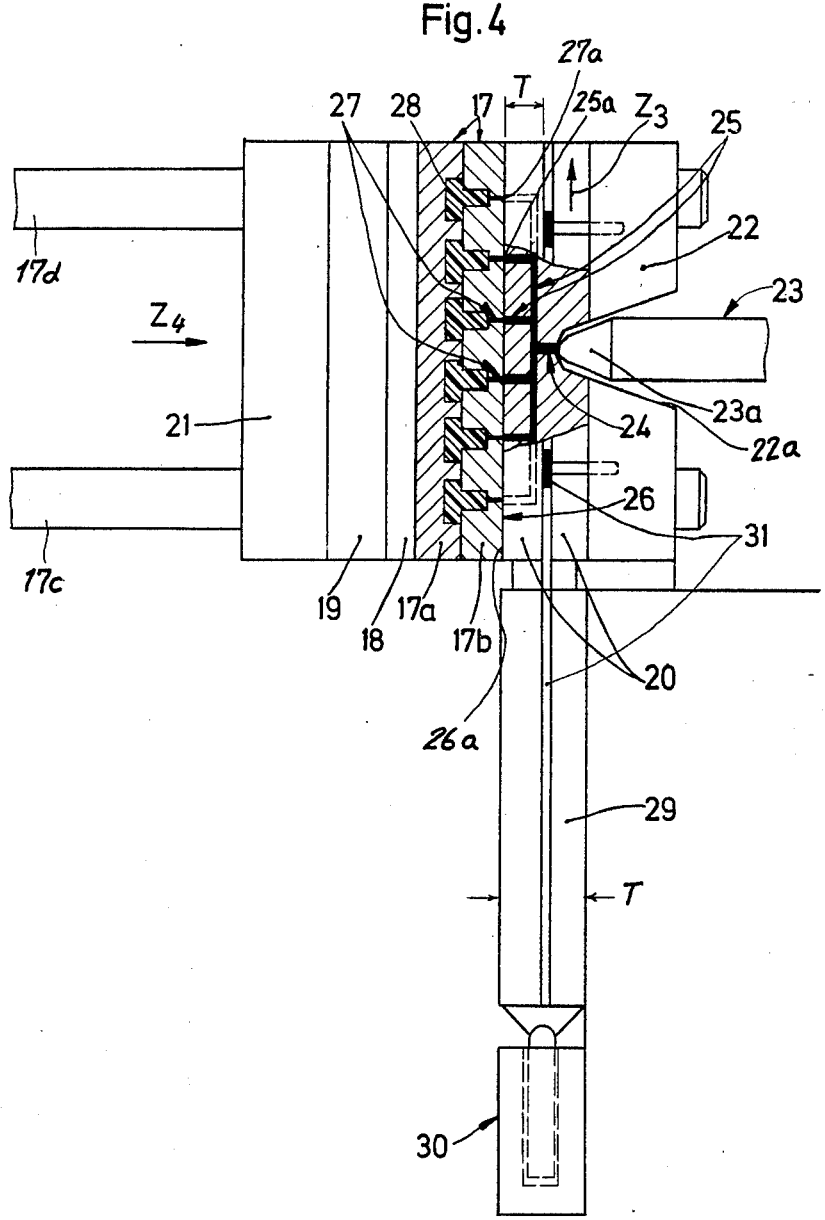

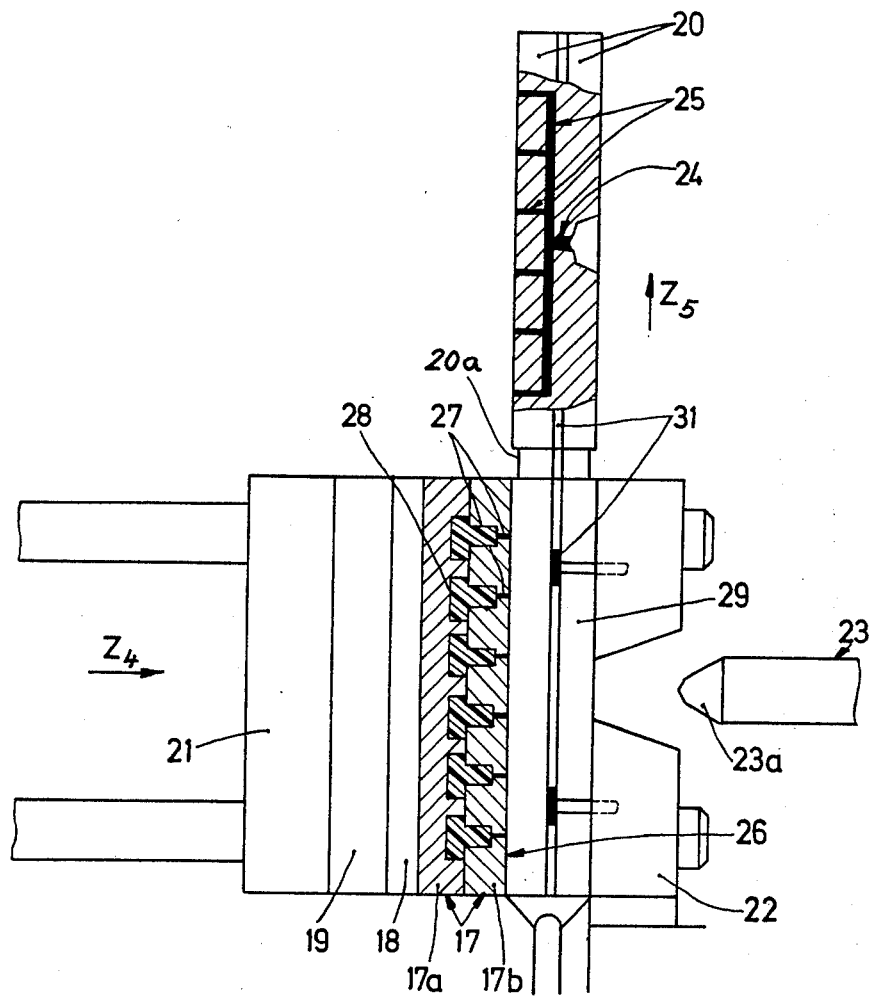

3,981,662

INJECTION-MOLDING MACHINE, ESPECIALLY FOR THERMOSETTING OR THERMALLY CROSS LINKABLE SYNTHETIC RESINS

FIELD OF THE INVENTION

The present invention relates to an injection-molding machine, a mold arrangement for an injection-molding machine and a method of operating an injection-molding machine to produce molded objects of a thermally crosslinkable or thermosetting material.

BACKGROUND OF THE INVENTION

It has been proposed heretofore to injection-mold synthetic-resin materials adapted to harden by chemical processes upon injection into a mold cavity, under the heat provided at the mold. Such substances include vulcanizable elastomers which are capable of crosslinking through the use of sulfur or other bridges, and thermosetting synthetic resins in which crosslinking takes place via functional groups provided on the synthetic-resin chains. The two types of materials and systems which combine features of both, can be described as thermally hardenable substances, i.e. substances which harden, set or cure at elevated temperatures.

In operating with such substances, care must be taken to prevent thermohardening of the flowable mass before it enters the mold cavity or mold cavities. In other words hardening of the synthetic resin or elastomer material in the distribution channels of the mold assembly must be prevented.

To this end, it has been proposed heretofore to provide the distribution channel on a plate mounted on or clamped against a mold half and in communication with the mold cavity, the plate being formed with cooling means, e.g. for the circulation of water or another coolant through the plate. Of course, this arrangement may prevent thermohardening of the synthetic resin mass in the distribution channels of the plate, but also may provide an undesirable cooling of the adjacent mold half so that the thermohardening process within the mold cavity does not occur efficiently. When no cooling is provided, the contact between the distribution or manifold plate and the mold half has the disadvantage that the heat transferred to the plate increases the tendency to setting within the distribution channels. A high temperature differential must thus be provided across the distribution plate and between the distribution plate and the adjoining mold half. It has already been shown that simple cooling of the distribution or manifold plate while the latter lies against the mold during the injection process is insufficient because of heat transfer to this plate.

OBJECTS OF THE INVENTION

It is the principal object of the present invention to provide an improved injection-molding machine or apparatus which avoids the difficulties mentioned above.

It is another object of this invention to provide an injection-molding machine or system, especially adapted to operate with thermohardening synthetic resin or elastomer materials, whereby the tendency of the injection-molded material to harden within the distribution channel is reduced or eliminated without expensive cooling means and the disadvantages associated with same.

Still another object of the invention is to provide an improved mold assembly for an injection-molding apparatus which, at low cost, restricts the heating of the manifold or distribution passages of an injection-molding machine operating with thermosetting or thermally crosslinkage materials.

Yet another object of the invention is to provide a method of operating an injection-molding machine to overcome the aforementioned disadvantages in a simple and economical manner.

SUMMARY OF THE INVENTION

These objects and others which will become apparent hereinafter are attained, in accordance with the present invention in a system whereby the temperature drop between the distribution and manifold portion and the mold-cavity portion of a separable injection-molding mold can be maintained without use of coolers or, at any rate, in a simpler and more economical arrangement than has been employed heretofore.

More specifically, the foregoing objects are attained in accordance with the invention by providing a mold assembly which, in addition to the separable mold members or mold halves, includes a distribution or manifold plate interposed between the mold and the injection apparatus (which may include a plastifying or masticating device and injection means), and means for withdrawing this plate from the mold during the working cycle, i.e. between the instant of injection and the time of complete hardening of the synthetic resin or elastomer mass.

Thus it is possible to allow the manifold channels or distribution passages to remain in heat-transmitting relationship with the mold only for the duration of the injection phase, during which the distribution channels communicate with the heated cavities. The undesired heat transfer from the mold to the distribution plate can occur only in the small fraction of the working cycle in which the plate abuts the mold. The distribution passages are thereby heated only to a slight extent.

Furthermore, the distribution plate, upon withdrawal from contact with the mold, can cool to a substantial extent in contact with the ambient atmosphere and special cooling ducts or thermal insulating means are not required. As a rule the mold assembly according to the aforementioned principles is simpler and less expensive.

According to another feature of the invention, especially in the case in which the mold is provided with numerous mold cavities, the mold members or mold halves can be interchanged while a common distribution plate is provided, especially if the openings of the mold are standardized to register with the passages of the distribution plate along the face thereof abutting the mold. Preferably the distribution plate is displaced together with the associated mold member during the mold-closing step by the pressure platen of the mold-closing means and is retained against the mold by the mechanism which may be provided to lock the mold in the closed position or to clamp the mold against the outward pressure of the injection-molded material. During injection, therefore, the mold-closing and mold-retaining means may be employed to urge the distribution plate against the mold members.

According to still another feature of the invention, we provide in the removable or withdrawable distribution plate auxiliary devices which may be employed during the injection-molding operation. Such devices may include throughflow ducts or the like for a tempering fluid medium adapted to maintain a constant temperature of the distribution passages, generally a temperature below that which is sustained in the mold cavities. In conventional systems such means are ineffective because the high degree of heat transfer from the mold to the distribution plate requires such massive cooling that a constant temperature cannot be successfully established.

For the insertion and withdrawal of the distribution plate, there is provided suitable means enabling the injection-molding apparatus to register with the distribution passages. Preferably the distribution plate is withdrawn or inserted in a direction parallel to the resin-injection direction. It has been found to be advantageous, moreover, to provide means for shifting the injection head out of its injection position to enable the distribution plate to be withdrawn or inserted. The injection head or apparatus, which may include the plastifying and masticating means mentioned earlier and an injection plunger or worm, may also be coupled to the distribution plate so that the two form a single structural unit capable of common movement. In this case, the entire distribution plate may replace the customary injection nozzle.

According to another feature of the invention, the distribution plate is inserted and withdrawn in a direction perpendicular to the mold-closing direction and is provided with an extension adapted to form a spacer of a thickness corresponding to the distribution plate and received between the pressure platen and the mold. In this case, the spacer will lie between the pressure platen and the mold in place of the distribution plate whereby a withdrawal of the pressure platen during removal of the distribution plate is unnecessary. The stroke of the mold-closing mechanism can thereby be reduced.

According to still another feature of the invention, this spacer plate may be provided with heating means (electrically or fluid operated) to facilitate heating of the mold compartments during setting of the thermohardening material subsequent to withdrawal of the distribution plate.

DESCRIPTION OF THE DRAWING

The above and other objects, features and advantages of the present invention will become more readily apparent from the following description, reference being made to the accompanying drawing in which:

FIG. 1 is an elevational view, partly broken away of an injection-molding machine, according to the present invention, with the distribution plate in position for supplying the thermohardening mass to the mold cavities, the mold-closing means being in its "closed" position;

FIG. 2 is an elevational view partly broken away, illustrating a withdrawn position of the distribution plate;

FIG. 3 is a fragmentary plan view of an injection-molding apparatus having a plurality of mold and/or mold-closing devices on a turntable arrangement whereby, with a single distribution plate, a number of molds can be charged successively with the thermohardening material;

FIG. 4 is an elevational view, partly in cross section illustrating another embodiment of the present invention whereby the distribution plate is coupled with a spacer plate; and FIG. 5 is a view similar to FIG. 4 showing the withdrawn position of the distribution plate.

SPECIFIC DESCRIPTION a. Structure of First Embodiment

In FIGS. 1 and 2, there is shown an injection-molding machine which comprises, generally, a mold-closing mechanism 1, an injection-molding apparatus 2 and a mold 3 which cooperate to produce cup-shaped objects in a multiplicity of mold cavities 4.

The injection-molding apparatus 2 comprises a base 16 mounted upon a turntable 50 adapted to turn about a vertical axis (see FIG. 3) for successive alignment of the injection-molding apparatus with a plurality of such molds and mold-closing mechanisms. The barrel of the injection-molding apparatus is represented at 51 and forms a plastifying device having heating mantles 52 of conventional constructions and an injection nozzle 2a. Upstream of the barrel 51 is a hopper 53 for the synthetic-resin material and a plunger assembly 54 for driving the worm of the plastifier to the left to inject the plastified synthetic-resin material into the mold. A motor assembly 55 drives the worm. The injection-molding barrel is mounted on a pair of trunnions 56, 57 on which the barrel may be tilted about a horizontal axis A to raise and lower the nozzle 2a as shown in FIGS. 1 and 2. To facilitate the tilting movement, the barrel is also provided with a lever 58 articulated to an arm 59 on each side of the barrel and capable of being raised and lowered by a fluid-operated cylinder 60 whose piston 61 is articulated at the pivot 62. The vertical axis about which the turntable may be rotated is shown at B.

Each of the molds 3 comprises a lower mold half 3a and an upper mold half 3b, together defining cup-shaped mold cavities 4 communicating via bores 5, having a uniform spacing a which is standardized to allow the molds to be interchanged, with bores 8a of the distribution passages of the distribution 7, which is coextensive with the top of the mold. The distribution plate 7 abuts the mold at its upper face 6 which may be ground smooth for this purpose, the underside of the distribution plate likewise having a ground flat surface. The passages 8a also have a spacing a which is, as noted, standardized to enable various molds 3 to be substituted for the one shown. The passages 8a of the manifold 8 also communicate with an inlet passage 9 alignable with the nozzle 2a of the injection-molding barrel to enable the moldable material to be introduced.

The mold 3 and the distribution plate 7 are received between a pair of pressure platens of the mold-closing device 1. The latter may comprise a plurality of uprights 63, 64, 65 and 66 fixed to a base 67 and carrying collars at which the mold 3 is retained against which the lower pressure plate 11, or anvil, is retained against downward movement. The posts 63 – 65 extend through the mold halves 3a and 3b which are guided on these posts. A head plate 69 at the top of the posts receives a fluid-operated cylinder 70 whose piston 71 is coupled to the movable platen 10.

As is also apparent, especially from FIG. 2, the support 16 is provided with a pedestal 15 carrying a pair of guide rails 14 (FIG. 3) in which the distribution plate 7 is slidable. The plate 7 is connected by piston rods 12 to a pair of hydraulic cylinders 13 lying in a common horizontal plane parellel to or in the direction of displacement of the plate 7 which thus may be withdrawn from the mold assembly or reinserted into the latter in the direction of arrow C.

b. Operation of First Embodiment

Assuming that the mold 3a, 3b had previously been opened and the molded articles extracted, the distribution plate 7 is shifted to the left to enter into a position into which it lies in direct force-transmitting relationship between the pressure platen 10 and the upper mold half 3b with the bores 8a in alignment with bores 5 of the mold. The mechanism 1 is closed to retain the distribution plate 7 sealingly against the mold and the mold in the closed condition under the mold-closing force or an augmented force calculated to permit injection of the flowable thermohardening material without separation of the parts of the mold assembly. The nozzle 2a is advanced forwardly by the working cylinders 72 and 73 on opposite sides of the barrel to align the nozzle 2a with passage 9 and the synthetic-resin material is injected into the mold cavities 4 of the mold 3 which is heated to an elevated temperature by conventional means not shown. The synthetic-resin material thus solidifies within the mold.

As soon as possible after the end of the injection stroke, the nozzle 2a is withdrawn and lowered (from the FIG. 1 position to that of FIG. 2), the pressure of platen 10 and the cylinder 70 is relieved and the distribution plate 7 is withdrawn via the cylinder 13 into the right-hand position illustrated in FIG. 2. In this position, further heat transfer from the heated mold 3 to the distribution plate 7 is impossible and the plate may cool in the ambient atmosphere. After withdrawal of the distribution plate, pressure is reapplied by the platen 10 and retained until complete solidification of the molded articles. Thereafter, the mold 3 is opened in the conventional manner and the molded articles are ejected.

c. Description and Operation of Second Embodiment

The system of FIG. 3 differs from that of FIGS. 1 and 2 only with respect to the replacement of the separate injection nozzle 2a of the earlier Figures, by a resin-distribution plate 107 which here constitutes the distribution nozzle while simultaneously being insertable and withdrawable from the mold assembly. In this case, the injection cylinder 2b and the distribution plate 107 form a common unit which may be displaced in the direction of the arrow $Z_2$ into and out of the assembly. A single drive structure represented at 113 performs this function. The stroke of the assembly in the direction of arrow $Z_2$ is so arranged and dimensioned that the passages 108 of the distribution plate, with which the manifold passage 109 communicates, are aligned with the channels 5 of the upper mold member in the fully inserted position of the plate. Otherwise the system operates in the manner already described.

From FIG. 3 it is also apparent that a single injection apparatus 102 etc. can be used to charge a succession of mold assemblies 3, each with its respective mold-closing system as represented at 1. The mold assemblies are here provided at angularly spaced intervals while the injection apparatus 2 is mounted upon a turntable so that the distribution plate 107 can be successively aligned with the remaining mold assemblies as the turntable is swung in the clockwise sense represented by arrow $Z_3$. After withdrawal of the distribution plate from one mold assembly and while the resinous material therein is cooling, the distribution plate 107 and the injection-molding apparatus 102 can be aligned with the next mold assembly, thereby shortening the time required for production of the molded bodies and increasing the utilization of the apparatus.

d. Structure and Operation of Third Embodiment

In FIGS. 4 and 5, we have shown an arrangement whereby the mold 17 consists of mold halves 17a and 17b which are mounted upon the guide rails 17c and 17d for opening and closing movement parallel to the arrow $Z_4$. The mold halves 17a and 17b together define mold cavities 28 which communicate with sprue channels 27 opening as bores 27a at a surface 26.

The remainder of the mold assembly comprises a heating plate 18 through which a high-temperature fluid may be circulated or which may be electrically heated in the conventional manner. A thermoinsulating plate 19, e.g. a laminate of materials of low thermal conductivity, may be interposed between the heating plate 18 and a pressure platen 21 against which the mold assembly is clamped by hydraulic working cylinders or the like.

At the other side of the mold assembly, the pressure platen is shown at 22 and is formed with a concavity 22a through which the injection head 23 and the nozzle 23a of an injection-molding apparatus as described in FIGS. 1, 2, 3 can pass. Between the pressure platen 22 and the mold 17, there is received, in the closed condition of the apparatus, a distribution plate 20 which is provided with distribution passages 25 having outlet bores 25a along the surface 26a of the distribution plate which is designed to abut the surface 26 previously mentioned. In proper registry of the distribution plate 20 and the right-hand mold half 17b, the bores 25a are aligned with, and communicate with the bores 27a. The distribution network includes an inlet passage 24 in the plate 20 which communicates with the nozzle 23a. During the injection, the synthetic-resin material flows from the nozzle 23, 23a, through the distribution passages 25 and into the mold cavities 28.

The distribution plate 20 has a thickness T which is equal to that of a spacer plate 29 which, like the distribution plate, is coextensive with the end of the mold against which the plates abut.

The spacer plate 29, which has no distribution passages and may be heated to augment the setting of the resinous material within the mold, is separated from the distribution plate 20 by a neck 20a of a material of low-thermal conductivity, e.g. a ceramic. The distribution plate 20 and the spacer plate 29 are shiftable in the direction $Z_5$ perpendicular to the mold-closing direction $Z_4$. After injection, the mold-closing pressure is somewhat relived and the spacer plate 29 is shifted into the mold in place of the distribution plate 20 by a hydraulic drive generally represented at 30. Guide means 31, in the form of grooves and lugs receivable in the grooves, may be provided on the plate 22 in order to assure proper positioning on the plates 20 or 29. The mold-closing device reapplies pressure after the spacer plate is inserted. The distribution plate 20 thus cools in contact with the ambient atmosphere and outside the mold assembly in a rapid manner while the spacer plate 29 promotes heating of the mold and setting of the synthetic-resin material.

Thus it is unnecessary to additionally cool the distribution plate 20 by passage of a cooling medium therethrough. However, it has been found to be advantageous in the case of a specially heat-sensitive material to provide cooling channels or other cooling means in the region of passage 25. Such cooling means can be employed to maintain a relatively low temperature of the distribution plate without significant cooling of the mold. At the interface 26 between the mold and the plate 20 can be provided with heat-resistant low-conductivity layers to reduce the heat transfer from the mold to the distribution plate although normally this expedient is unnecessary.

The invention has been found to be especially advantageous when high temperatures are required at the mold cavity and much lower temperatures are to be sustained in the distribution plate as noted earlier. However, it is equally desirable to use the above-described principles for situations in which the distribution plate is to have the high temperature and a cool temperature is to be provided in the region of the mold cavities. This is the case for the molding of thermoplastic materials and, for this reason we have used the concept of a "high temperature gradient" between the distribution plate and the mold. In the latter modification, the heated or hot distribution plate only briefly contacts the cooled mold so that heating of the latter is reduced and cooling of the distribution plate, with solidification of the thermoplastic material, is prevented. The higher cooling rate at the mold increases the speed with which the thermoplastic bodies can be solidified.

The invention is equally applicable for systems in which the mold is provided with a single fluid passage and the supply passage from the distribution plate is relatively long and/or possesses a large cross section. In these latter cases a large amount of the resinous material remains in the distribution passage or passages.

We claim:

1. An injection-molding system for a thermally sensitive moldable material, comprising a separable mold having at least two mold members defining at least one mold cavity and formed with at least one channel communicating with said cavity and opening at a surface of the mold perpendicular to a mold-opening and mold-closing direction; mold-closing means for retaining said mold members under pressure in said direction; a material-distribution plate separate from said mold members and alignable with said surface, displaceable transversely to said direction and provided with at least one throughgoing distribution passage communicating with said channel in an inserted position of said plate; means for selectively inserting said plate into the effective path of said mold-closing means and fully withdrawing said plate from alignment with said surface and out of the effective path of said mold-closing means and fully out of heat communication with said mold; and injection means for injecting said material into said passage of said plate at least in said inserted position thereof.

2. The system defined in claim 1 wherein said mold-closing means includes a pressure platen, said plate being received between said platen and said surface in an inserted position of said plate.

3. An injection-molding system for a thermally sensitive moldable material, comprising a separable mold having at least two mold members defining at least one mold cavity and formed with at least one channel communicating with said cavity and opening at a surface of the mold perpendicular to a mold-opening and mold-closing direction; mold-closing means for retaining said mold members under pressure in said direction: a material-distribution plate separate from said mold members and alignable with said surface and provided with at least one throughgoing distribution passage communicating with said channel in an inserted position of said plate; means for selectively inserting said plate and withdrawing said plate from alignment with said surface; injection means for injecting said material into said passage of said plate at least in said inserted position thereof, said mold-closing means including a pressure platen, said plate being received between said platen and said surface in an inserted position of said plate, said injection means being provided with a nozzle registerable with said passage and means for shifting said nozzle into and out of registry with said passage, said plate being shiftable in the direction in which said material is injected from said nozzle, said nozzle being displaced to clear said plate for withdrawal thereof.

4. The system defined in claim 3 wherein said plate is provided with temperature control means for establishing a predetermined temperature in said plate.

5. The system defined in claim 2 wherein said injection means is provided with a nozzle registerable with said passage, further comprising means for shifting said nozzle into and out of registry with said passage.

6. The system defined in claim 2 wherein said injection means includes an injection cylinder and said plate forms a unit with said cylinder for movement jointly therewith.

7. The system defined in claim 2 further comprising a spacer plate coupled with said distribution plate and receivable between said platen and said surface upon withdrawal of said distribution plate, said spacer plate having a thickness equal to that of said distribution plate.

8. The system defined in claim 7 wherein said spacer plate is provided with heating means.

9. The system defined in claim 3, further comprising guide means along the flanks of said plate and alignable with said mold for directing movement of said plate relative to said mold.

10. The system defined in claim 3 wherein said passage opens laterally of said plate to communicate with said injection means.

* * * * *